Figure 1:
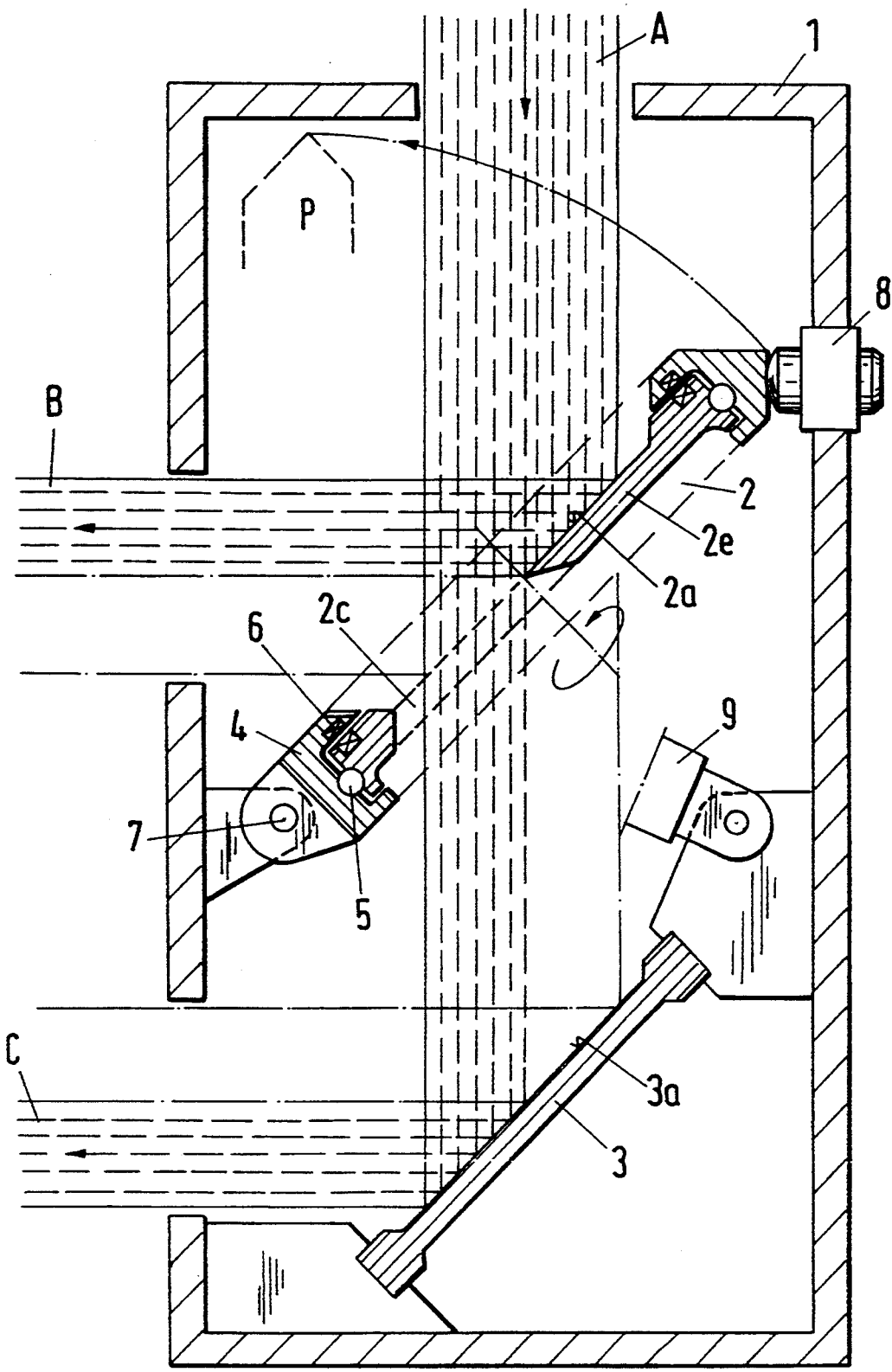

United States Patent [19]
Sturm

[11] Patent Number: 5,394,270
[45] Date of Patent: Feb. 28, 1995

[54] OPTICAL BEAM DIVIDER FOR A LASER BEAM

[75] Inventor: Joseph Sturm, Duisburg, Germany

[73] Assignee: Thyssen Stahl Aktiengesellschaft, Duisburg, Germany

[21] Appl. No.: 135,905

[22] Filed: Oct. 13, 1993

[30] Foreign Application Priority Data

Oct. 19, 1992 [DE] Germany ............................ 4235165

[51] Int. Cl.⁶ ...................... G02B 26/02; G02B 26/08; G02B 27/14
[52] U.S. Cl. .................................... 359/636; 359/226; 359/235
[58] Field of Search ............... 359/636, 220, 226, 233, 359/234, 235

[56] References Cited

U.S. PATENT DOCUMENTS

| | | |
|---|---|---|
| 4,087,162 | 5/1978 | Kuffer et al. |
| 4,478,477 | 12/1984 | Helms et al. ......................... 359/636 |
| 4,478,513 | 10/1984 | Skinner et al. ....................... 359/636 |
| 4,878,747 | 11/1989 | Sting et al. .......................... 359/636 |
| 5,113,055 | 5/1992 | Kuriyama . |

FOREIGN PATENT DOCUMENTS

| | | |
|---|---|---|
| 0229194 | 11/1985 | European Pat. Off. . |
| 1291533 | 11/1969 | Germany . |
| 2937914 | 3/1980 | Germany . |
| 61-67591 | 8/1986 | Japan . |
| 237564 | 4/1945 | Switzerland . |
| 1593268 | 7/1981 | United Kingdom . |

*Primary Examiner*—Jon W. Henry
*Attorney, Agent, or Firm*—Meltzer, Lippe, Goldstein, Wolf, Schlissel & Sazer

[57] ABSTRACT

The invention relates to an optical beam divider which subdivides a beam (A), more particularly a laser beam, into at least two beams (B, C) which differ from the original beam (A) only in intensity. To this end the beam divider has a deflecting mirror (2) which is disposed in the path of the beam (A) and which rotates around an axis lying perpendicular to the plane of the mirror and has at least one window (2c) which sweeps the whole cross-section of the beam (A) when the deflecting mirror (2) rotates.

6 Claims, 3 Drawing Sheets

OPTICAL BEAM DIVIDER FOR A LASER BEAM

The invention relates to an optical beam divider, more particularly for a laser beam, having a deflecting mirror constructed in the form of a diaphragm which is disposed in the path of the beam and which can be rotated around an axis lying perpendicularly to its mirror plane and sweeps the cross-section of the beam.

The versatile possible applications of laser beams are generally known. Laser beams are suitable, for example, for the parting of continuously moving strips, more particularly metal strips.

Frequently a number of parallel cuts must be performed on the strips—e.g., in splitting installations, or in cutting the edges of strips. The simultaneous production of the cuts as a rule requires laser beams guided in parallel. It would be very expensive to use a separate laser beam source for each cut. Expenditure might be reduced if the laser beam of a single laser beam source could be successfully subdivided. However, in such beam dividers the cross-section of the component beams must remain unaltered in comparison with the original cross-section, and the energy must be distributed as uniformly as possible over the cross-section. However, such beam dividers as meet this requirement are not yet available for industrial use.

In one prior art beam divider (DE 31 35 205 A1) for a beam of light supplied via a light conductor, a deflecting mirror can be moved to a varying distance into the path of the light beam supplied. One part, collected by that particular cross-section of the light beam, is deflected by the mirror, while the remaining part passes the deflecting mirror unimpeded. The result with that beam divider is two component beams whose cross-sections correspond only in total to the cross-section of the original light beam. The cross-section of the individual component beams is therefore smaller than the cross-section of the original light beam. Using that kind of beam divider, therefore, it is impossible to obtain the original shape of the light beam—i.e., the same cross-sectional dimension with a uniform distribution of energy over the cross-section.

In the case of another prior art beam divider of the kind specified (DE-PS 12 91 533) the deflecting mirror has at least one window: The arrangement is such that the deflecting mirror either deflects the full beam or passes the full beam through with the window in alignment. This means that in one phase the beam receiver receives the full radiation energy, but no radiation energy during the pauses. This uneven distribution of energy over time is non-optimum.

It is an object of the invention to provide a beam divider of the kind specified which retains the shape and size of the cross-section of the beam to be subdivided, while at the same time ensuring a uniform distribution of energy over the cross-section of the subdivided component beams.

This problem is solved in a beam divider of the kind specified by the feature that the deflecting mirror has at least one window which covers only a segment of the total cross-section of the beam and sweeps in succession all the segments of the beam when the deflecting mirror rotates.

According to the invention both the component beam collected by the deflecting mirror and also the component beam or component means passed through by the window or windows each sweep a surface which corresponds to the full/total cross-section of the original beam. The energy of each component beam is uniformly distributed over the total cross-section in accordance with the original distribution of energy. The faster the deflecting mirror is rotated, the better is the quality of distribution over the surface. In addition or alternatively, the radiation energy impact can be more satisfactorily uniformized by the mirror having a number of mirror surfaces disposed more particularly symmetrically distributed around the axis of rotation.

In the case of subdivision into a number of component beams, the intensity of the original light or laser beam is subdivided in accordance with the ratio of the operative mirror surfaces—e.g., the intensity is halved in the case of a subdivision into two component rays by a deflecting mirror whose mirror surface and window surface are of equal size.

A uniform energy distribution can be obtained by another simple feature of the invention, namely that each mirror surface and each window is constructed in the form of a segment extending radially from the axis of rotation.

If the original beam is to be subdivided into more than two component beams, this requirement can be met by the feature according to the invention that disposed in the path of the beam is at least one further identical deflecting mirror which can be rotated in synchronism with the first deflecting mirror and whose at least single mirror surface and whose at least single window are in alignment with each window of the first deflecting mirror preceding in the path of the beam. According to another feature of the invention, a last deflecting mirror is disposed in the path of the beam with a full surface and stationary.

The axis of rotation of the deflecting mirror is preferably disposed inclined at an angle of 45° to the axis of the beam to be subdivided, so that one of the two component beams is deflected at an angle of 90° to the original direction of the beam.

If the component beams are to extend parallel with one another, this can be achieved by a further deflecting mirror disposed parallel with the rotatable deflecting mirror. The extra mirror can either be disposed following the rotatable deflecting mirror or in the direction of the beam downstream thereof.

Figure 2:
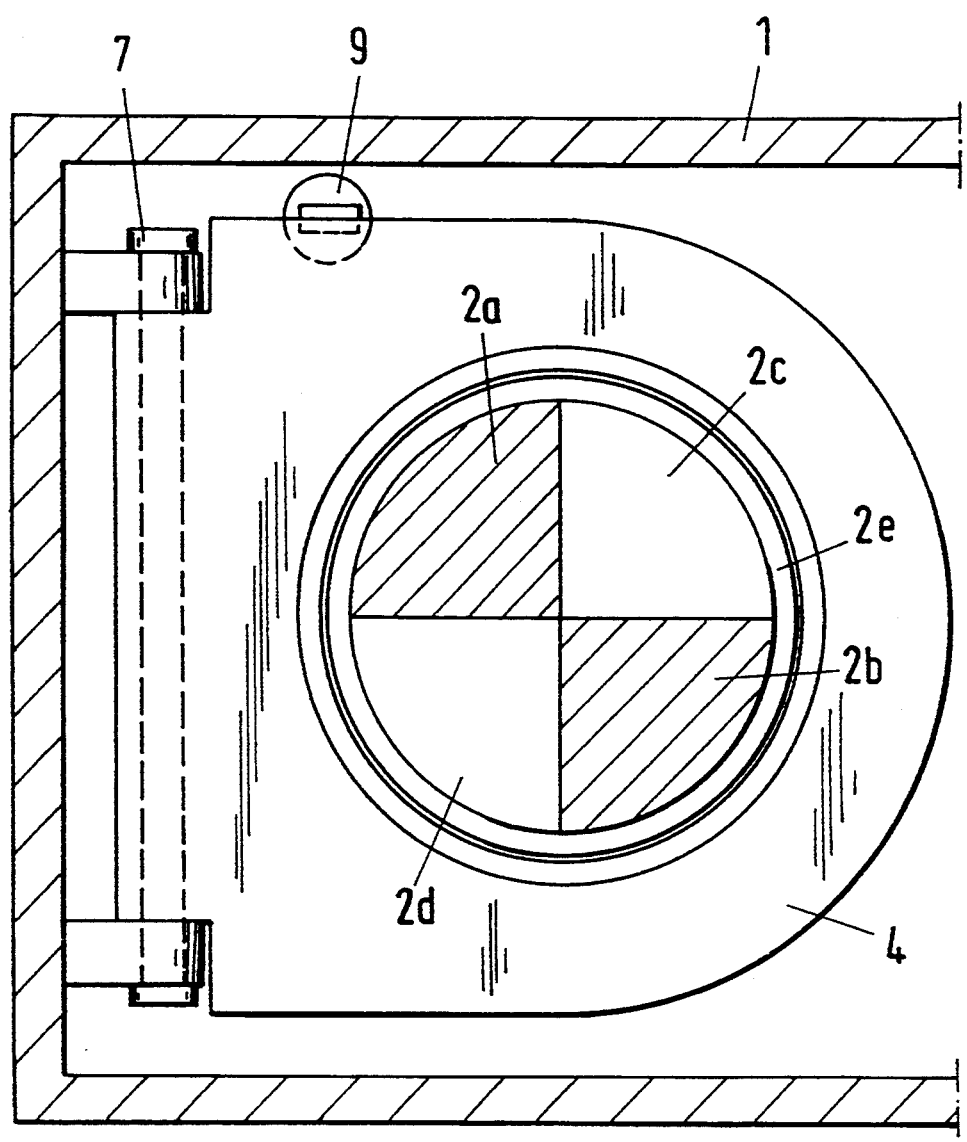
Figure 3:
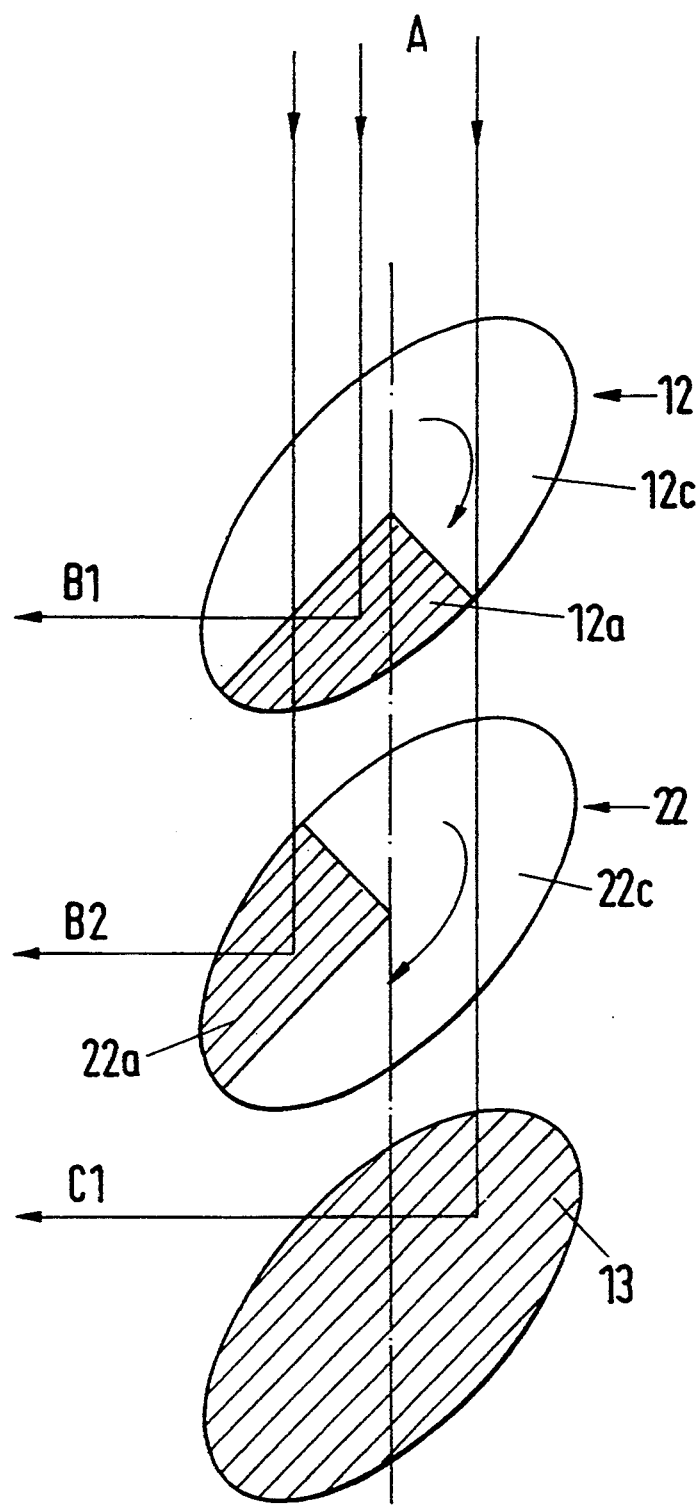

An embodiment of the invention will now be explained in greater detail with reference to the diagrammatic drawings, wherein:

FIG. 1 is an axial section through a beam divider having a rotatable and a stationary deflecting mirror, FIG. 2 is a view, in the direction of the beam, of the rotatable deflecting mirror of the beam divider shown in FIG. 1, and FIG. 3 shows diagrammatically deflecting mirrors disposed in series in the path of the beam, including two rotatable deflecting mirrors and one stationary deflecting mirror.

Referring to FIG. 1, a beam divider for a laser beam A has a casing 1 in which two deflecting mirrors 2, 3 are disposed in series in the path of the laser beam A. Of the deflecting mirrors 2, 3, the last deflecting mirror 3 in the path of the beam is disposed stationary and has a full-area mirror surface 3a, while the first deflecting mirror 2 in the path of the beam is rotatable and takes the form of a diaphragm.

The deflecting mirror 2 is circular and subdivided into four segments, two of which are constructed as mirror surfaces 2a, 2b and two as windows 2c, 2d. The mirror surfaces 2a, 2b and the windows 2c, 2d are enclosed by a rim 2e mounted to rotate via a bearing 5 in a frame 4. Operating between the rim 2e and the frame 4 is a rotary drive 6 which can be constructed after the fashion of a motor, in which case the rim 2e comprises the motor with winding and the frame 4 the stator with winding.

At its bottom edge the frame 4 is mounted in a pivot 7 and bears via its other edge against an adjustable stop 8. By means of an adjusting member 9 which engages with the frame 4, the frame 4 can be pivoted with the rotatable deflecting mirror 2 out of the position shown in the drawing into a vertical position indicated by an arrow P therein. The incident original beam/full beam A is not subdivided in this case, as may be required in a special application.

The aforedescribed beam divider operates as follows: The full-area beam A first impinges on the deflecting mirror 2. Since the deflecting mirror 2 does not have a full mirror surface, but only two segment-like mirror surfaces 2a, 2b, only two beams B are deflected, whose cross-sections correspond to the segment-like mirror surfaces 2a, 2b, while the remaining component beams impinge through the windows 2c, 2d on the following deflecting mirror 3 and are then deflected therefrom in the form of component beams C. Since the two deflecting mirrors 2, 3 have the same orientation—i.e., are disposed parallel with one another -, two parallel component beams B, C emerge from the casing 1. However, the parallel position of the component beams B, C is not stationary, but is displaced in a circle, since due to the rotation of the deflecting mirror 2, the masked part and the part passed through are constantly displaced. As a result, therefore, the component beams B, C sweep an area whose cross-section is equal to the area of the full beam A. The only difference from the full beam is that the intensity of the component beams B, C is lower: with equal areas of the mirror surfaces 2a, 2b and the windows 2c, 2d the intensity of the two component beams B, C is half as large.

The embodiment illustrated in FIG. 3 differs from that shown in FIGS. 1 and 2 essentially only by the feature that the full beam is subdivided into three component beams B1, B2, C1. This is possible if a first and second deflecting mirror 12, 22 rotate in synchronism and their mirror surfaces 12a, 22a and windows 12c, 22c are so disposed in relation to one another that a component beam falls through the window 12c of the first deflecting mirror 12 on to the mirror surface 22a of the second deflecting mirror 22, while a component beam falls both through the window 12c of the first deflecting mirror 12 and also through the window 22c of the second deflecting mirror 22 on the last deflecting mirror 13. It is immaterial whether the last deflecting mirror 13 is constructed With a full surface and stationary or rotates in synchronism and with a full or part mirror surface on to which the component beam passing through the windows 12c and 22c of the first and second deflecting mirrors 12, 22 falls. In any case the last deflecting mirror 13 ensures that the third component beam C1 is also directed parallel with the other component beams B1, B2.

I claim:

1. An optical beam divider for a laser beam comprising:

a deflecting mirror in the form of a diaphragm disposed in the path of said beam, said mirror being rotatable around an axis lying perpendicular to a mirror plane of said deflecting mirror for sweeping a cross-section of said beam, wherein a cross-section of said deflecting mirror corresponds to said cross-section of said beam, wherein an axis of said beam intersects said axis of said deflecting mirror at the surface of said deflecting mirror, wherein said deflecting mirror comprises at least one window corresponding to only a segment of said cross-section of said beam, wherein said at least one window extends to said axis of said deflecting mirror, wherein said deflecting mirror further comprises means for bearing and driving said deflecting mirror disposed at an outer edge of said deflecting mirror, and wherein said rotation of said deflecting mirror sweeps each segment of said beam in succession.

2. A beam divider according to claim 1, characterized in that a last deflecting mirror (3, 13) is disposed in the path of the beam with a full surface and is stationary.

3. A beam divider according to claim 2, characterized in that the last deflecting mirror (3, 13) is disposed parallel with the preceding deflecting mirror (2, 12).

4. A beam divider according to one of claim 1, characterized in that the rotatable deflecting mirror (2) has a number of mirror surfaces (2a, 2b) distributed symmetrically around the axis of rotation.

5. A beam divider according to claim 4, characterized in that each mirror surface (2a, 2b) and each window (2c, 2d) is constructed in the form of a segment extending radially from the axis of rotation.

6. A beam divider according to one of claim 1, characterized in that disposed in the path of the beam is at least one further identical deflecting mirror (12) which can be rotated in synchronism with the first deflecting mirror (12) and whose at least single mirror surface (22a) and whose at least single window (22c) are in alignment with each window (12c) of the first deflecting mirror (12) preceding in the path of the beam.

* * * * *